United States Patent [19]
Michael

[11] Patent Number: 5,274,404
[45] Date of Patent: Dec. 28, 1993

[54] MOLDED EYEGLASSES WITH MOLDED IN BRIDGE

[75] Inventor: Wolman Michael, Suffern, N.Y.

[73] Assignee: Aristo International Corporation, New York, N.Y.

[21] Appl. No.: 687,730

[22] Filed: Apr. 19, 1991

[30] Foreign Application Priority Data

Aug. 6, 1990 [IL] Israel ......................... 95381

[51] Int. Cl.$^5$ .................................. G02C 5/06
[52] U.S. Cl. ........................ 351/126; 351/124; 351/129
[58] Field of Search ............... 351/110, 124, 126, 129, 351/130, 65, 106

[56] References Cited

U.S. PATENT DOCUMENTS

| | | |
|---|---|---|
| 205,860 | 7/1878 | Hawkes . |
| 233,681 | 10/1880 | Landsberg . |
| 235,930 | 12/1880 | Borsch . |
| D. 322,262 | 12/1991 | Manus . |
| 1,167,953 | 1/1916 | Uhlemann ............... 351/124 |
| 1,227,620 | 5/1917 | Holley . |
| 1,805,529 | 5/1931 | Nelson . |
| 2,117,139 | 5/1938 | Bouchard . |
| 2,225,038 | 12/1940 | Diggins . |
| 2,269,037 | 1/1942 | Oker . |
| 3,824,006 | 7/1974 | Voit . |
| 3,930,824 | 1/1976 | Knowles . |

FOREIGN PATENT DOCUMENTS

| | | | |
|---|---|---|---|
| 61555 | 10/1982 | European Pat. Off. | ............ 351/126 |
| 1424549 | 12/1965 | France | .................. 351/126 |

Primary Examiner—Bruce Y. Arnold
Assistant Examiner—Hung Xuan Dang
Attorney, Agent, or Firm—Ostrolenk, Faber, Gerb & Soffen

[57] ABSTRACT

Molded eyeglasses, including two rimless molded lenses with a plastic material bridge having end portions which are molded into and embedded in the molded lenses. The invention is useful for pince-nez or normal eyeglasses. The bridge end portion is completely surrounded by lens material.

19 Claims, 2 Drawing Sheets

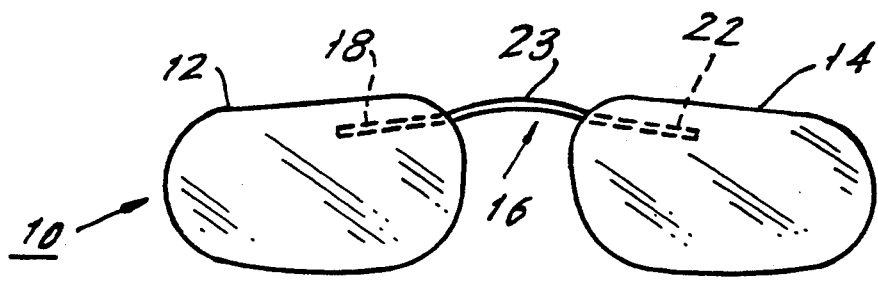
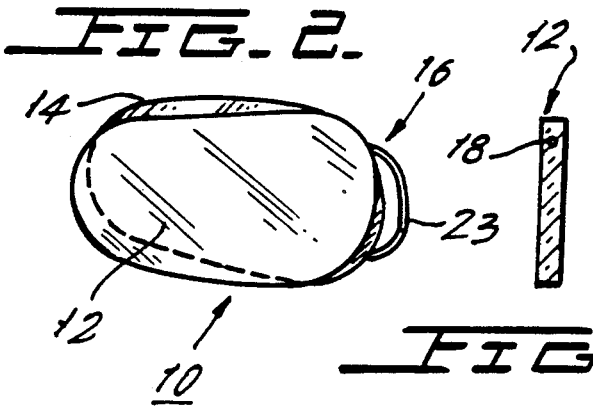
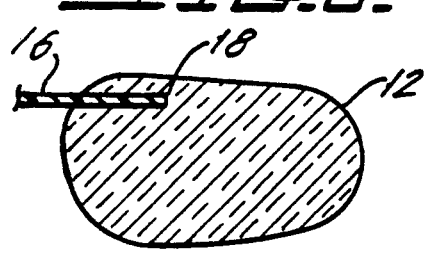
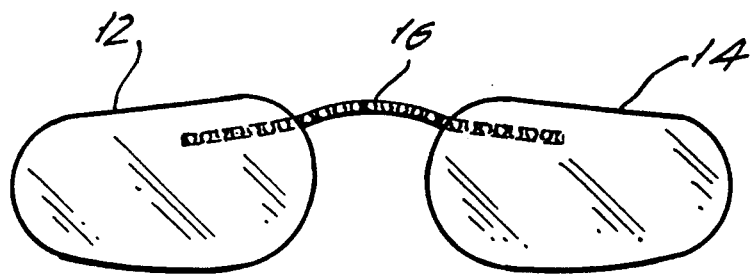
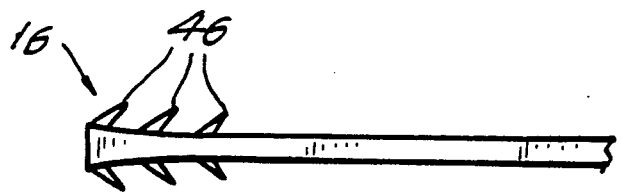

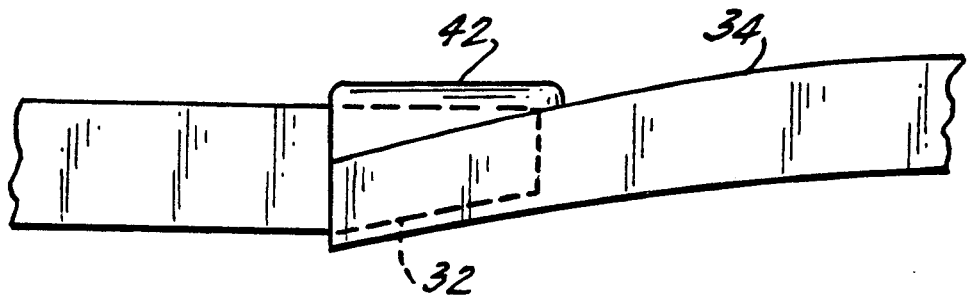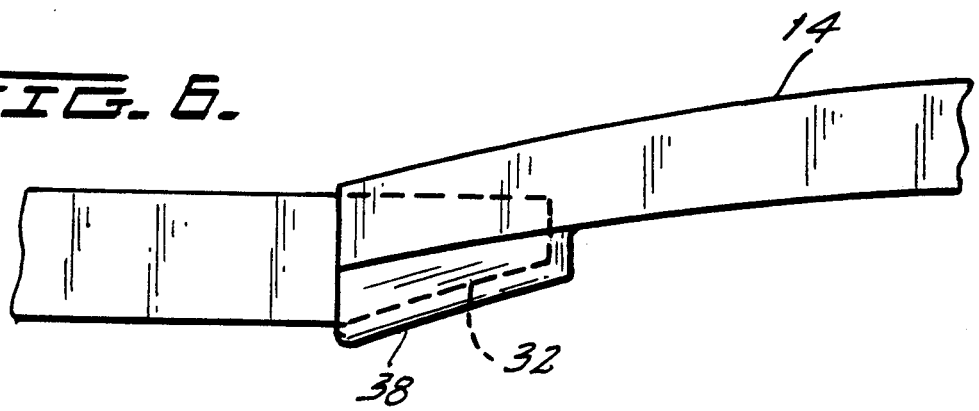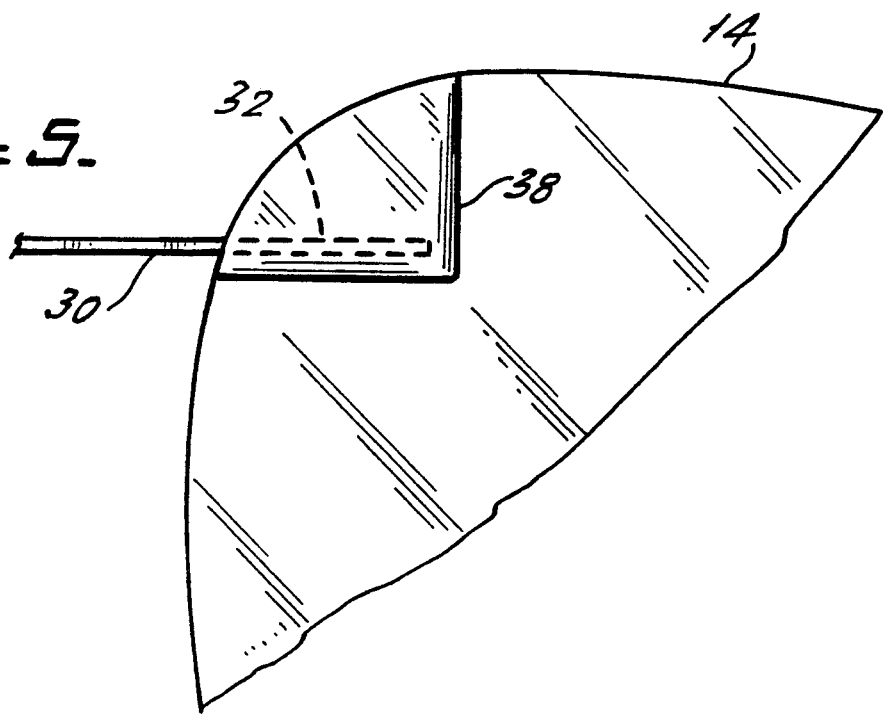

MOLDED EYEGLASSES WITH MOLDED IN BRIDGE

BACKGROUND OF THE INVENTION

The present invention relates to the bridge of molded eyeglasses. The invention is particularly useful for eyeglasses of the "Oxford" or pince-nez type, although the invention need not be limited to those type of eyeglasses.

Oxford eyeglasses or pince-nez have been used for many years. Many different types of eyeglasses are kept in place by the spring action, e.g. the springiness of the material of the bridge that extends between the two lenses, which pushes the lenses toward each other and squeezes them on the nose. This pressure keeps the eyeglasses in place.

Many patents disclose different eyeglasses of this type, for instance, U.S. Patent Nos. 365,496, 1,116,153, 1,214,184, 1,654,996, 1,663,053, 1,682,038, 1,800,266, 1,873,338, 1,953,995, 1,935,224, 1,973,126, 1,973,587, 1,974,455, 2,014,092, 2,016,685, 2,064,411 and 2,071,058.

The use of Oxford eyeglasses has been largely discontinued. Eyeglasses normally employed today rely on temples and earpieces for positioning the lenses. Modern eyeglasses do not present the drawbacks of prior Oxford glasses in that they are not heavy on the nose, are more stable and do not apply a pressure on the nose which may be irritating.

Recently, there has been consumer demand for eyeglasses which can be inexpensive, can be considered disposable, and which may be purchased essentially off-the-shelf at a low price. Normal eyeglasses with temples and earpieces are available on the market with different standard sight corrections, so that a suitable pair of eyeglasses can be obtained for use and can then be disposed of. Also, disposable sunglasses are becoming available.

For normal eyeglasses and also for Oxford type eyeglasses, various techniques are known for attaching the bridge to the lens. These include attaching the ends of the bridge to frames or rims surrounding the two lenses or where the lens are unframed (at least in the region of the bridge), attaching the ends of the frame directly to the lens, e.g. by clipping them onto the lens or into grooves formed in the lens. See for example, U.S. Pat. Nos. 233,681; 235,930; 205,860; 1,227,620; 2,117,139; 2,225,038; 2,629,037; and see 3,930,824.

These bridge attachment techniques require appropriate fastening fixtures be supplied on the bridge and/or the lenses and require the separate step of applying the previously formed bridge to the previously formed lenses. Avoidance of the need for these separate fixtures and steps could decrease the expense of eyeglass production.

Various materials are used for eyeglass bridges, including various metals and plastics. Size, weight, expenses of materials and of manufacture, appearance, consistency with the lens frames are some criteria for selection of a bridge material. The simpler is the bridge design and the less that the bridge need be shaped or bent, the easier and less expensive can be production of the bridge and of the eyeglasses.

SUMMARY OF THE INVENTION

It is a primary object of the present invention to provide easily and inexpensively manufactured eyeglasses, and particularly Oxford type eyeglasses.

Another object is to easily and simply attach the bridge of the eyeglasses to the lenses.

Yet another object is to reduce the steps needed to fabricate eyeglasses including lenses and a bridge which joins them.

A further object of the present invention is to provide eyeglasses which are substantially made of molded material and are inexpensive, and may be used for emergency and for daily use alike.

It is another object of the invention to provide a method by which molded eyeglasses of this type can be easily produced.

In the invention, the preformed bridge is integrated with the eyeglass lenses as the lenses are being formed. This avoids the need for a later bridge attachment step. The preferred way of accomplishing this is to mold the bridge along with eyeglass lenses. In one embodiment, first each end of the bridge is placed in the respective mold cavity for the respective lens and then the lens is molded around the end of the bridge for integrating the bridge with the lenses.

The molded eyeglasses according to the invention preferably comprise two rimless lenses and a bridge whose ends are molded into the lenses to elastically connect the two lenses.

The lenses and bridge ends must be of compatible material so that the lens will mold securely around the bridge end.

The lenses can be made of any suitable moldable plastic material which has the optical properties which are required of eyeglasses and which are safe for the eyes. One example of such a suitable material is polymethyl-methacrylate (Perspex). The eyeglasses may be entirely transparent, without any coloring, or they may be colored to provide different shades and may be darkened so as to become sunglasses. It should be noted that any suitable type of lens having suitable optical properties is acceptable, and the invention is intended to exploit all such known optical techniques.

Because the lenses are made of molded plastic material and may be made rimless, the weight of the eyeglasses as a whole and of each lens are considerably smaller than for any normal eyeglasses or pince-nez.

For simply formed, inexpensive Oxford type eyeglasses, the bridge is of appropriate springy material which will urge the lenses against the sides of the nose. This technique permits the bridge to be made from a simple, single strip of resilient, springy material.

According to a preferred embodiment the bridge is shaped, e.g. bent, to hold the lenses closer together than the width of a wearer's nose so that when the lenses are separated on the nose, the bridge biases the lenses against the nose. Each end of the bridge is rigidly connected to one of the two lenses. This means that the elastic, resilient bridge will bend when the two lenses are separated. No pivot or joint is provided to connect between a lens and the end of the bridge.

The bridge preferably comprises a sufficiently elongate elastic member. Such an elongated elastic member can be of any type, and is not necessarily made of one piece. But, using one piece of plastic is preferred. The bridge need merely provide the necessary spacing between the two lenses, and be elastic enough so as to apply the required pressure on the nose, and possibly to permit the two lenses to be brought together if desired, for compact lens overlying storage, as explained below.

The elongate member bridge can be made of a variety of materials, as long as it fulfills the elasticity requirements. In one embodiment of the invention the elongate member is made of plastic material which may be the same as or different from the plastic material of which the eyeglass lenses are made but the bridge must be of a material that is moldable into the lenses. An example of a suitable plastic material for the bridge, which has the desired mechanical properties, is a polyamide, preferably Nylon 6.6. When the bridge is made of plastic material, it has the added advantage that it can be made of differently colored materials, to effect a desired appearance of the finished article. If the bridge is made of moldable plastic material, the entire article may be lightweight and can be easily produced in one mold, as discussed above.

According to less preferred but possible embodiments of the invention, the elongate elastic bridge may be a bar or a rod or may be a spring element, e.g. a helicoidal spring. It may be made of stainless steel, which can be anodized for improved appearance.

According to another preferred embodiment of the invention, the ends of the bridge may be provided with irregularities, such as protrusions, recesses, folds, curves or wrinkles to promote strong holding of the molded lens material around the end portions of the bridge.

The invention further encompasses a method for producing rimless molded eyeglasses, which method comprises the steps of:

(a) providing an elongate bridge, e.g. a plastic member;

(b) providing a mold in the size and shape of two eyeglass lenses and spacing the cavities of the mold so that the lens with a bridge between them will be correctly spaced apart;

(c) positioning the bridge within the mold, in a position substantially symmetrical with respect to both lenses, so that each end portion of the bridge is positioned within the portion of the mold which defines one lens; and (d) injecting a plastic material into the mold for forming the two lenses and incorporating within each molded lens one end portion of the bridge.

According to another embodiment of the invention, the bridge is produced in situ. It is made of a moldable plastic material, and it is created by injecting the bridge material into the corresponding parts of the mold.

Other objects features of the invention are described with reference to the accompanying drawings.

BRIEF DESCRIPTION OF THE DRAWINGS

FIG. 1 illustrates eyeglasses according to one embodiment of the invention.

FIG. 2 shows the eyeglasses of FIG. 1 in the folded condition.

FIG. 3 is a front view illustrating the connection between the bridge of the eyeglasses and the lenses.

FIG. 4 is a cross sectional view of the connection shown in FIG. 3.

FIG. 5 shows one end of a bridge of a preferred embodiment in a lens.

FIG. 6 is a top and cross sectional view showing the bridge connection in one version of the preferred embodiment.

FIG. 7 is the same view a FIG. 6 of a different version.

FIG. 8 shows another embodiment.

FIG. 9 shows one end of another bridge embodiment.

DESCRIPTION OF THE PREFERRED EMBODIMENTS

Referring to FIG. 1, the illustrated Oxford type eyeglasses or pince-nez 10 have two lenses 12, 14 which are joined by the elastic material bridge 16. The elastic bridge includes opposite end regions 18, 22 which extend a short distance into and through the lens peripheries and are molded into the lenses 12, 14, respectively.

The bridge 16 is shaped to include a central, upwardly projecting, rounded hump 23 which passes over the bridge of the nose. Also the bridge is of elastic, resilient material which is normally self biased to urge the lenses 12, 14 together which presses them against the side of the nose to hold the eyeglasses securely in place. Also, the bridge 16 is shaped to hold the lenses slightly apart to ease their mounting over the nose.

The eyeglasses can be folded compactly together by bringing one lens toward the other, thus applying tension on the elastic member 2. In the resulting folded position, as shown in FIG. 2, the lenses overlie each other.

FIGS. 3 and 4 show one connection between the end portion 18 of the elongate bridge 16 and one of the lenses 12. FIG. 3 shows a lens 12 of FIG. 1 in a front view, with the end region of the elongate bridge 16 being shown. FIG. 4 shows the lens 12 in a side view and the end portion 18 of the bridge 16 penetrates through the facing opposite peripheries of and into the lens to some extent, and is firmly embedded in the material of the lens. This connection can be made in any suitable way known in the art. For instance, the end portion 18 can be placed in the mold for the lens, and molded lens plastic material can be molded around it.

In FIGS. 3 and 4, the bridge is, at least at the end portions where it projects into the lens, narrow enough, front to back, that it is wholly surrounded by molded lens material. It may be desirable for the strength and/or appearance of the bridge to make the bridge, and especially its end portions, wider than the eyeglass lens is thick front to back. It is undesirable to have the bridge projecting out of the front and/or back side of the lens. Also, such projecting bridge material could scratch the surface defining the mold cavity, destroying the ability of the mold to produce an optical quality lens.

FIG. 5 is a front view of the lens 14 and an edge view of the bridge 30 embedded in the lens. The bridge 30 is a simple single preformed strip of resilient plastic. Its end portion 32 projects into that side of the lens 14 which faces the other lens. The top views of FIGS. 6 and 7 show that the end portion 32 of the bridge strip 30 is wider front to back than the thickness of the lens 14 of FIG. 6 or 34 of FIG. 7. On the inward edge region of the lens, at least at the end portion 32 of the bridge, the edge region 38 of the lens is thickened so as to completely surround the bridge end portion. The end portion 32 is shown to be tapered in shape in the direction into the lens. This minimizes the thickness profile of the bridge that must be surrounded toward the center of the lens. But the illustrated tapering is optional and may be omitted if forming it in the bridge requires an unwanted extra fabrication step. Bridges can be molded individually or be stamped out from a sheet, or be die cut from a continuous ribbon, and can be shaped as needed in the same step in which they are formed.

In FIG. 6, the upper corner edge region 38 of the lens 14 is thickened rearwardly of the lens, so that there is no esthetically unpleasant bump on the front of the lens 34. In FIG. 7, the upper corner edge region 42 projects forwardly of the lens. While the edge region 38 or 42 is shown only at the upper corner, it could extend around more of the lens, and can rise more or less gradually from the lens surface for appearance reasons.

FIG. 8 illustrates a different type of elastic bridge embodiment. The elastic bridge is comprised of a helicoidal spring, which has natural elastic properties. The end portions of the helicoidal spring may be molded into the lenses as in the other embodiments.

FIG. 9 illustrates irregularities 46, such as protrusions, at the end portions of elongate bridge 16 of FIG. 1, only half of the bridge being shown. The protrusions 46 are embedded in the lens molded around them strongly connecting the lenses with the bridge. Other irregularities, like recesses, folds, wrinkles, curves, etc. may be used.

The invention has been illustrated only with Oxford type eyeglasses or pince-nez. But it can also be used for standard eyeglasses which have temples attached to the lenses and extending back to the wearer's ears. Further, the invention has been shown with rimless lenses, as they are simplest to make and do not involve fabrication of a rim and assembly of the rim to the lenses. But the invention can be used with lenses having a partial or a total rim.

Modifications can be made in the eyeglasses of the invention, different methods can be provided to produce these molded lenses, a large variety of construction materials can be employed, and many different elongate elastic bridge members can be used.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Eyeglasses comprising:
   two lenses;
   a bridge having opposed end portions extending between and separating the lenses, wherein each end portion extends into and is firmly embedded within one of the lenses for attaching the bridge to the lenses.

2. Eyeglasses comprising:
   two molded lenses formed of a moldable lens material;
   a bridge having opposed end portions extending between and separating the lenses, wherein each end portion extends into and is molded with the lens material, and the molded lens material attaches the bridge to the lenses.

3. The eyeglasses of claim 2, wherein each of the lenses has a respective side periphery and the end portions of the bridge are embedded within the lens peripheries.

4. The eyeglasses of claim 3, wherein the lenses are rimless.

5. The eyeglasses of claim 4, wherein the eyeglasses consist of the two lenses and the bridge.

6. The eyeglasses of claim 3, wherein the bridge comprises an elongated elastic member, for normally self biasing the lenses toward each other for gripping a wearer's nose.

7. The eyeglasses of claim 6, wherein the elongated elastic member comprises a spring element.

8. The eyeglasses of claim 7, wherein the spring is a helicoidal spring.

9. The eyeglasses of claim 6, wherein the elongate member bridge is comprises of plastic material.

10. The eyeglasses of claim 9, wherein the plastic material is a polyamide.

11. The eyeglasses of claim 9, wherein the lenses are made of polymethyl-methacrylate.

12. The eyeglasses of claim 6, wherein the eyeglasses consist of the two lenses and the bridge.

13. The eyeglasses of claim 3, wherein each of the lenses include a respective edge region and the edge portions of the bridge project into the edge regions, wherein the lenses at the edge region have a thickness from front to back large enough to completely surround the end portions.

14. The eyeglasses of claim 13, wherein each of the lenses have front and rear surfaces, and the bridge is thicker than the lenses where the end portions project into the lenses, and the edge regions into which the edge portions project are thicker than the rest of the lenses so as to surround the end portions.

15. The eyeglasses of claim 14, wherein each of the edge regions comprise a thickened region projecting forwardly of the front surface of the lens.

16. The eyeglasses of claim 14, wherein each of the edge regions comprise a thickened region projecting rearwardly of the rear surface of the lens.

17. The eyeglasses of claim 3, wherein the end portions are provided with a plurality of protrusions for establishing a strong hold between the molded material and the end portions.

18. A method for molding eyeglasses with an elongated bridge, comprising the steps of:
   (a) providing a mold in the size and shape of two lenses;
   (b) positioning the elongated bridge within the mold, in a position substantially symmetrical between both lenses, wherein end portions of the elongated bridge are positioned to extend within portions of the mold which define the lenses; and
   (c) inserting a plastic material into the mold for forming the lenses and for incorporating and embedding within each molded lens one end portion of the elongated bridge.

19. The method of claim 18, wherein the bridge is positioned in the mold by the insertion of material of which the bridge is comprised into the mold when the plastic material of the lens has been inserted into the mold.

* * * * *